(No Model.) 2 Sheets—Sheet 1.

C. P. SCHEURITZEL & J. L. HESS.
DYNAMO ELECTRIC MACHINE.

No. 443,407. Patented Dec. 23, 1890.

WITNESSES:
Chas. Niela
C. Sedgwick

INVENTOR:
C. P. Scheuritzel
J. L. Hess
BY Munn & Co.
ATTORNEYS (No Model.) 2 Sheets—Sheet 2.

C. P. SCHEURITZEL & J. L. HESS.
DYNAMO ELECTRIC MACHINE.

No. 443,407. Patented Dec. 23, 1890.

WITNESSES:
Chas. Nida.
C. Sedgwick.

INVENTOR:
C. P. Scheuritzel
J. L. Hess
BY Munn & Co.
ATTORNEYS

UNITED STATES PATENT OFFICE.

CHARLES PAUL SCHEURITZEL AND JOHN LUDWIG HESS, OF BROOKLYN, NEW YORK.

DYNAMO-ELECTRIC MACHINE.

SPECIFICATION forming part of Letters Patent No. 443,407, dated December 23, 1890.

Application filed February 5, 1890. Serial No. 339,370. (No model.)

*To all whom it may concern:*

Be it known that we, CHARLES PAUL SCHEURITZEL and JOHN LUDWIG HESS, both of Brooklyn, in the county of Kings and State of New York, have invented a new and Improved Dynamo-Electric Machine, of which the following is a specification, reference being had to the annexed drawings, forming a part thereof, in which—

Figure 2:
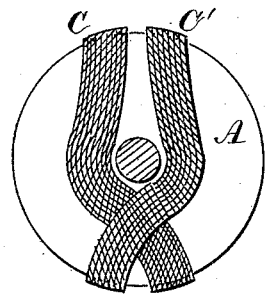
Figure 1:
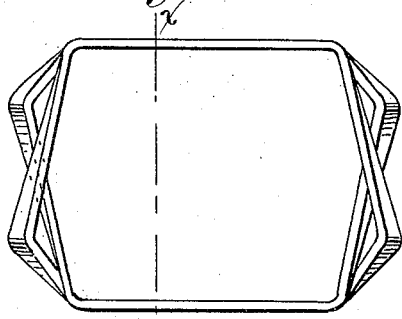
Figure 3:
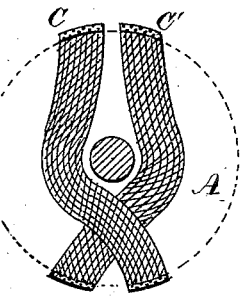
Figure 5:
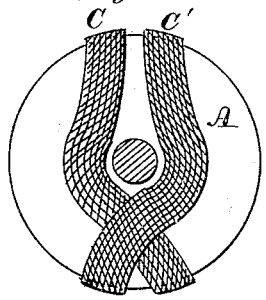
Figure 4:
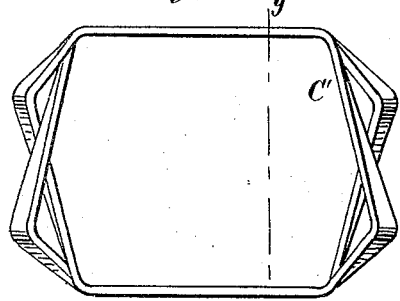
Figure 6:
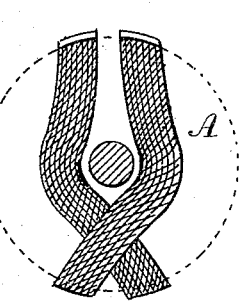
Figure 7:
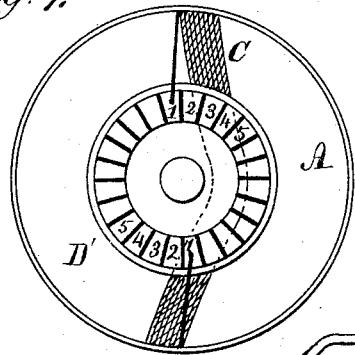
Figure 8:
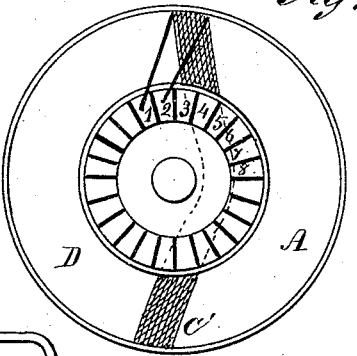
Figure 9:
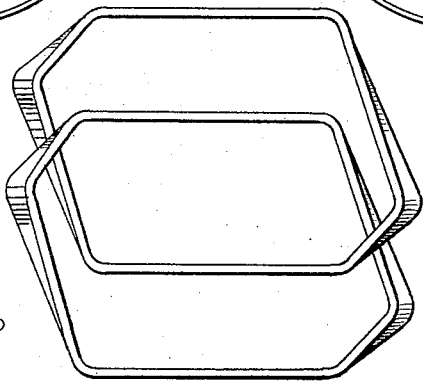
Figure 10:
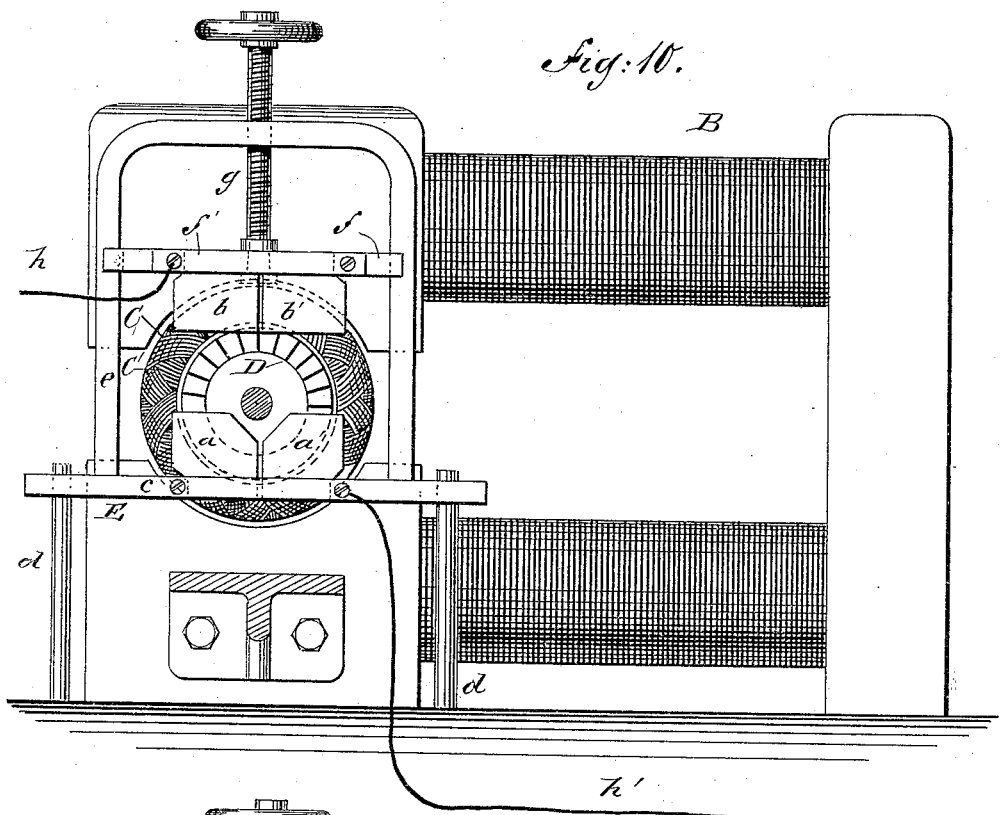
Figure 11:
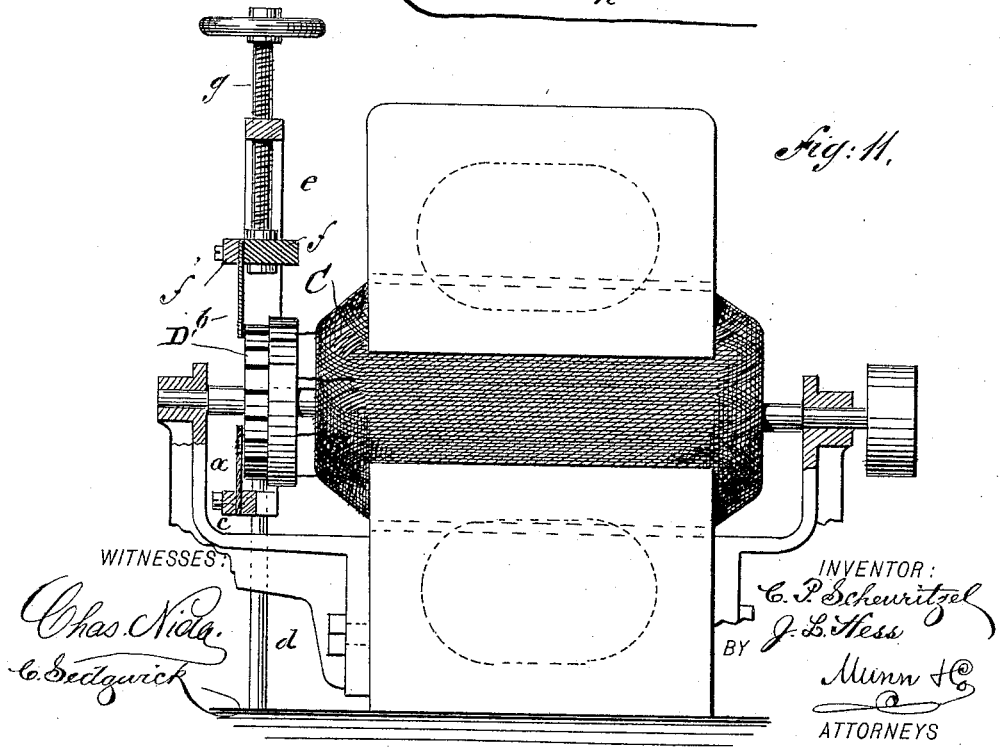

Figure 1 is a side elevation of a pair of armature-coils used in our improved dynamo. Fig. 2 is an end elevation of the armature-core with the two coils applied. Fig. 3 is a transverse section taken on line $x\,x$ in Fig. 1. Fig. 4 is a side elevation of a pair of armature-coils which are linked together. Fig. 5 is an end elevation of the armature-core with a pair of the coils shown in Fig. 4 applied. Fig. 6 is a transverse section taken on line $y\,y$ in Fig. 4. Fig. 7 is an end elevation of an armature and commutator with one of the coils of the armature in place, showing the connection of the terminals of the coil with the commutator in an open-circuit armature. Fig. 8 is an end elevation of an armature with one coil in place, showing the arrangement of the terminal connections for a closed-circuit machine. Fig. 9 is a side elevation of a pair of armature-coils linked together, as shown in Fig. 4. Fig. 10 is an end elevation, partly in section, of an open-circuit dynamo; and Fig. 11 is a side elevation of the same, partly in section.

Similar letters and figures of reference indicate corresponding parts in all the views.

The object of our invention is to construct an electric generator and motor which may be operated upon an open or closed circuit plan, in which the armature-coils may be made separately of uniform lengths and afterward applied to the armature-core and connected with the commutator.

The object of our invention is also to furnish a commutator by which the current may be varied according to requirements, so as to permit of furnishing a variable current of a constant potential.

Our invention consists, in part, in an armature formed of coils of equal length made separately and applied to the armature, so as to overlap each other and form a regular series around the armature-core.

The invention further consists of a novel arrangement of commutator brushes or collectors, whereby the current may be given from the coils singly in succession or from two or more coils in parallel, all as will be hereinafter more fully described.

The armature-core A and field-magnet B may be of any approved form of construction, as we do not claim these parts, except as they enter into combination with our improved armature-winding and our devices for taking off the current. The coils C C', which are applied to the armature-core, are wound separately upon a suitable form, which (when the coils are used upon a cylindrical core, as in the present case) gives them approximately the shape of an irregular hexagon, with a long side and a short side diagonally opposite each other and approximately parallel. These coils are applied to the armature-core in alternation, the shorter side of one coil being inserted in or passed through the longer side of the adjacent coil, as shown in Figs. 1 to 8, inclusive. This order of the coils is maintained throughout the entire winding, and in an open-circuit armature the terminals of each coil are brought out upon diametrically opposite sides of the armature, as shown in Fig. 7.

In a closed-circuit armature the terminals of each coil are brought out upon the same side of the armature, as shown in Fig. 8. The coils are bent laterally at their ends to carry them around the armature-shaft, as shown in Figs. 2, 3, 5, and 6.

Where the coils are arranged as shown in Figs. 1 and 3, the same coil extends over the coil underneath it at both ends of the armature; but where the coils are wound one through the other, so as to be linked together in the operation of winding, as shown in Figs. 4 to 6 and 9, the coil which overlaps at one end of the armature is overlapped by the adjacent coil at the opposite end of the armature, as shown in Fig. 4. When the coils are thus linked together, the entire series of coils on the armature form an endless chain. In all other respects the winding shown in Figs. 1 to 3, inclusive, and Figs. 4 to 6, inclusive, are alike.

When the armature is to be constructed on a closed-circuit principle, the terminals of each coil, which are brought out upon the same side of the armature, are preferably connected in the following order: To the bars 1 2 3 4, &c., of the commutator-cylinder D the first terminal of the first coil is connected with bar 1 of the commutator-cylinder and the last terminal of the same coil is connected with bar 2. The first terminal of the second coil is connected with bar 2 of the commutator-cylinder and the last terminal with bar 3, and so on around the entire circumference of the armature. In this case there will be as many bars in the commutator as there are coils upon the armature.

In the case of the open-circuit armature the commutator D' will have twice as many bars as there are coils upon the armature, and the terminals of the respective coils will be connected with diametrically-opposite bars of the commutator-cylinder. In the present case we have numbered the bars of the commutator-cylinder in two series, beginning at diametrically-opposite points and extending around the cylinder in the same direction. The terminals of the first coil will therefore be connected with the commutator-bars 1 1, those of the second coil with the commutator-bars 2 2, and so on throughout the entire series.

The closed-circuit armature is used in connection with a field-magnet of ordinary construction, and the current is taken from the commutator-cylinder by means of commutator-brushes in the usual way.

In the case of the open-circuit armature (shown in Figs. 7, 10, and 11) the current is taken off by means of plates $a$ $a'$ and brushes $b$ $b'$, which are arranged to touch the ends of the commutator-bars. The plates $a$ $a'$ are held in a fixed position, so as to contact with the ends of the bars of the lower half of the commutator, while the brushes $b$ $b'$ are made adjustable, so as to contact with one commutator-bar or any greater number up to one-half. We have shown one means of supporting and adjusting these plates; but we do not limit or confine ourselves to this means.

The frame E is formed of the bar $c$, supported by standards $d$, and a rectangular frame $e$, attached to the bar $c$. An adjustable cross-bar $f$, of insulating material, is notched at its end so as to slide upon the uprights of the frame E, and is connected by a swivel-joint with the adjustable screw $g$, extending through the top of the frame. To the bar $c$ are attached the plates $a$ $a'$, and to the bar $f$ are clamped the brushes $b$ $b'$ by the metallic bar $f'$. A conductor $h$ is connected with the bar $f'$ and a conductor $h'$ is connected with the bar $c$.

The field-magnet B may be excited by a current taken from its armature or by a current from an outside source, and it may be series or compound wound, as circumstances may require. When the armature is revolved between the poles of the field-magnet, currents are induced in the conductor of the armature, which are taken off through the plates or brushes $a$ $a'$ $b$ $b'$. The electro-motive force of the current remains the same, whether the current is taken from one or two coils or from the entire series of coils arranged in parallel circuit. The number of coils included in the parallel circuit is governed by the position of the brushes $b$ $b'$. When the said brushes are moved downward so as to contact with half of the series of commutator-bars, all of the coils are in parallel and the machine yields the largest current it is capable of generating.

When it is desired to use a large conductor, a coil formed of a single wire or bar or cable may be used. We do not confine ourselves to any particular length of wire upon the armature or the number of convolutions in each coil.

It is obvious that our machine is able to furnish a variable current of constant potential. It is therefore peculiarly adapted to incandescent lighting, as the regulation of the current may be effected by the movement of the brushes $b$ $b'$, and no energy need be wasted by the introduction of resistance.

Our machine is adapted to all electrical uses.

Having thus described our invention, we claim as new and desire to secure by Letters Patent—

1. In a dynamo-electric machine, an armature formed of a core and a series of coils, each having the shape of an irregular hexagon, with long and short sides diagonally opposite each other, and with parallel sides of equal length diametrically opposite each other forming the active portions of the coil, the coils alternating in position on the armature-core, as herein shown and described.

2. In a dynamo-electric machine, an armature formed of a series of coils wound one through the other so as to be linked together, forming an endless chain, substantially as specified.

3. In a dynamo-electric machine, the combination, with the commutator-cylinder, of one or more brushes arranged to contact with all of the commutator-bars upon one side of the diametrical line of the commutator-cylinder, and one or more adjustable brushes arranged to contact with one or more of the commutator-bars on the opposite side of the diametrical line of the commutator-cylinder, substantially as specified.

4. In a dynamo-electric machine, the combination of an armature provided with a commutator having one bar for each terminal of each armature-coil, a frame provided with fixed collector-plates, an adjustable bar guided by the frame and carrying brushes, and an adjusting-screw for changing the position of the movable brushes, substantially as specified.

CHARLES PAUL SCHEURITZEL.
JOHN LUDWIG HESS.

Witnesses:
JAMES L. MADIGAN,
JOHN F. O'BRIEN.